3,639,384
MONOAZO COMPOUNDS CONTAINING A 3-ACYL-
AMIDOANILINE COUPLING COMPONENT
Max A. Weaver and Herman S. Pridgen, Kingsport, Tenn.,
assignors to Eastman Kodak Company, Rochester, N.Y.
No Drawing. Filed July 12, 1968, Ser. No. 744,335
Int. Cl. C09b 29/06; D06p 1/02
U.S. Cl. 260—152          12 Claims

ABSTRACT OF THE DISCLOSURE

Monoazo compounds having a heterocyclic diazo component and a 3-acylamidoaniline coupling component in which the aniline nitrogen atom is substituted with an aralkyl group are useful as dyes for polyester textile materials.

---

This invention relates to certain novel monoazo compounds and, more particularly, to monoazo compounds useful as dyes for polyester textile materials and to polyester textile materials dyed with the novel compounds.

The novel azo compounds of the invention have the formula

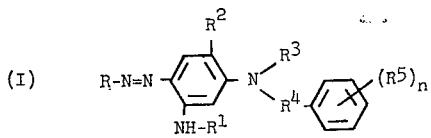

(I)

wherein

R is a 2-thiazolyl radical, a 2-benzothiazolyl radical, a 1,3,4-thiadiazol-2-yl radical, a 1,2,4-thiadiazol-5-yl radical, a 3-pyrazolyl radical, or a 2-thienyl radical;
$R^1$ is an acyl group;
$R^2$ is hydrogen, lower alkyl, or lower alkoxy;
$R^3$ is alkyl of 1 to about 6 carbon atoms or cyclohexyl;
$R^4$ is alkylene of 1 to about 2 carbon atoms;
$R^5$ is hydrogen, lower alkyl, lower alkoxy, or halogen; and
$n$ is 1 or 2.

The novel compounds of the invention give red to blue dyeings when applied according to conventional dyeing procedures to polyester textile materials such as fibers, yarns and fabrics. The novel azo compounds exhibit improved fastness and build-up properties on polyesters. The superior sublimation fastness possessed by the compounds of the invention renders them particularly useful in the thermal fixation technique of dyeing polyester materials.

The heterocyclic diazo component represented by R can be unsubstituted or, preferably, substituted with, for example, lower alkyl, lower alkoxy, aryl, nitro, halogen, lower alkylthio, lower alkoxycarbonylalkylthio, cyclohexylthio, arylthio, lower aralkylthio, formyl, lower alkanoyl, lower alkoxycarbonyl, aroyl, lower alkanoylamino, aroylamino, cyano, lower alkylsulfonyl, arylsulfonyl, lower alkylsulfonamido, trifluoromethyl, sulfamoyl, lower alkylsulfamoyl, carbamoyl, lower alkylcarbamoyl, thiocyanato, etc. The alkanoyl groups can be substituted with substituents such as halogen, phenyl, cyano, lower alkoxy, lower alkylthio, lower alkylsulfonyl, etc. The alkylsulfonyl groups can also be substituted, for example, with cyano, hydroxy, halogen and the like. The alkoxycarbonyl groups can be substituted, for example, with hydroxy or cyano. As used herein to describe a group containing an alkyl moiety, "lower" designates a carbon content from 1 to about 4 carbon atoms. Examples of the alkyl and alkoxy groups which can be present on the diazo components include methyl, ethyl, isopropyl, propyl, butyl, methoxy, ethoxy, propoxy, butoxy, etc.

Chlorine and bromine are typical halogen atoms. Methylsulfonyl, ethylsulfonyl, propylsulfonyl, butylsulfonyl, 2-cyanoethylsulfonyl, 2-hydroxyethylsulfonyl, acetyl, propionyl, butyryl, isobutyryl, 3-chloropropionyl, cyanoacetyl, methoxycarbonyl, ethoxycarbonyl, propoxycarbonyl, 2-cyanoethoxycarbonyl, 2-hydroxyethoxycarbonyl, etc. are examples of the alkylsulfonyl, alkanoyl, and alkoxycarbonyl groups which can be present on the heterocyclic groups represented by R.

Acetamido, propionamido, methylsulfonamido, ethylsulfonamido, and butylsulfonamido are typical alkanoylamino and alkylsulfonamido substituents which can be present on the diazo component. Dimethylsulfamoyl, ethylsulfamoyl, butylsulfamoyl, diethylcarbamoyl, propylcarbamoyl, dibutylcarbamoyl are examples of the alkylsulfamoyl and alkylcarbamoyl groups. The aroyl groups which can be present on the diazo component including the aryl moiety of the arylthio, aralkylthio, aroyl and arylsulfonyl groups are preferably monocyclic, carbocyclic aryl such as phenyl and phenyl substituted, for example, with lower alkyl, e.g. tolyl; lower alkoxy, e.g. anisyl; halogen, e.g. chlorophenyl, bromophenyl; etc. Benzoyl, p-toloyl, p-chlorobenzoyl, p-nitrobenzoyl, p-ethoxyphenylthio, p-chlorobenzylthio, benzamido, p-tolylamino, p-tolylsulfonyl, p-ethoxyphenylsulfonyl, etc. are examples of the aryl-containing groups which can be present on the heterocyclic groups represented by R. The acyl groups set forth below in the definition of $R^1$ are further examples of the groups which can be present on the diazo component.

Typical groups represented by R include 2-thiazolyl,
5-nitro-2-thiazolyl,
5-bromo-2-thiazolyl,
5-thiocyanato-2-thiazolyl,
4-trifluoromethyl-2-thiazolyl,
4-ethoxycarbonyl-2-thiazolyl,
5-cyano-2-thiazolyl,
5-acetamido-2-thiazolyl,
4-methylsulfonyl-2-thiazolyl,
4-methyl-5-nitro-2-thiazolyl,
2-benzothiazolyl,
6-methylsulfonyl-2-benzothiazolyl,
6-ethoxycarbonyl-2-benzothiazolyl,
6-cyano-2-benzothiazolyl,
6-sulfamoyl-2-benzothiazolyl,
6-thiocyanato-2-benzothiazolyl,
6-N,N-dimethylsulfamoyl-2-benzothiazolyl,
4,6-dichloro-2-benzothiazolyl,
4-methyl-6-nitro-2-benzothiazolyl,
5-methyl-1,3,4-thiadiazol-2-yl,
5-thiocyanato-1,3,4-thiadiazol-2-yl,
5-cyclohexylthio-1,3,4-thiadiazol-2-yl,
5-ethylthio-1,3,4-thiadiazol-2-yl,
5-phenylthio-1,3,4-thiadiazol-2-yl,
5-acetamido-1,3,4-thiadiazol-2-yl,
5-chloro-1,3,4-thiadiazol-2-yl,
5-β-cyanoethylthio-1,3,4-thiadiazoyl-2-yl,
5-ethoxycarbonylmethylthio-1,3,4-thiadiazol-2-yl,
5-phenylsulfonyl-1,3,4-thiadiazol-2-yl,
3-methylsulfonyl-1,2,4-thiadiazol-5-yl,
3-butylthio-1,2,4-thiadiazol-5-yl,
4-cyano-3-pyrazolyl,
4-nitro-3-pyrazolyl,
4-carbamoyl-3-pyrazolyl,
3-methylsulfonyl-1,2,4-thiadiazol-5-yl,
4,5-dicyano-2-phenylsulfonyl-3-pyrazolyl,
5-methyl-4-nitro-2-phenyl-3-pyrazolyl,
4-cyano-2-methyl-3-pyrazolyl,
4-methoxycarbonyl-2-phenyl-3-pyrazolyl, 5-acetyl-3-nitro-2-thienyl,
5-benzoyl-3-nitro-2-thienyl,
3-nitro-5-p-toluoyl-2-thienyl,
3,5-di(methylsulfonyl)-2-thienyl,
5-methylsulfonyl-3-nitro-2-thienyl,
3-nitrothienyl,
5-ethylsulfamoyl-3-nitrothienyl,
3,5-dinitro-2-thienyl,
5-ethoxycarbonyl-2-thienyl, etc.

Preferred groups represented by R have the formula

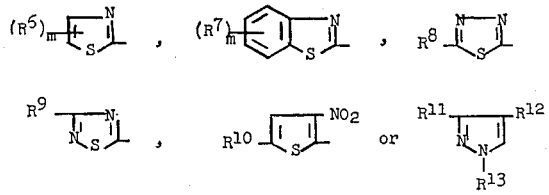

wherein $R^6$ is hydrogen, lower alkyl, lower alkoxy, nitro, halogen, lower alkylsulfonyl, carbamoyl, lower alkylcarbamoyl, lower alkoxycarbonyl, sulfamoyl, lower alkylsulfamoyl, cyano, thiocyanato, trifluoromethyl, phenyl or substituted phenyl; $R^7$ is hydrogen, lower alkyl, lower alkoxy, nitro, halogen, lower alkylsulfonyl, substituted lower alkylsulfonyl, carbamoyl, lower alkylcarbamoyl, lower alkoxycarbonyl, sulfamoyl, lower alkylsulfamoyl, cyano, thiocyanato, lower alkylthio, cyclohexylthio, phenylthio, substituted phenylthio, or trifluoromethyl; $R^8$ is hydrogen, lower alkyl, lower alkoxy, halogen, lower alkylthio, benzylthio, cyclohexylthio, phenylthio, substituted phenylthio, phenyl, substiuted phenyl, benzyl, lower alkylsulfonyl, lower alkanoylamino, lower alkylsulfonamido, benzamido, lower alkoxycarbonyl, lower alkoxycarbonylalklthio, thiocyanato, sulfamoyl, or lower alkylsulfamoyl; $R^9$ is lower alkylthio, cyclohexylthio, benzylthio, or lower alkylsulfonyl; $R^{10}$ is lower alkanoyl, benzoyl, or substituted benzoyl; $R^{11}$ is hydrogen, cyano, or lower alkyl; $R^{12}$ is cyano, carbamoyl, nitro, or lower alkoxycarbonyl; $R^{13}$ is hydrogen, lower alkyl, phenyl, substituted phenyl, lower alkylsulfonyl, phenylsulfonyl, or substituted phenylsulfonyl; and $m$ is 1 or 2. When $m$ is 2, the substituents represented by $R^6$ and $R^7$ can be the same or different.

The acyl groups represented by $R^1$ can be formyl, lower alkanoyl, aroyl, cyclohexylcarbonyl, lower alkoxycarbonyl, aryloxycarbonyl, lower alkylsulfonyl, arylsulfonyl, carbamoyl, lower alkylcarbamoyl, arylcarbamoyl, furoyl, etc. The alkanoyl and alkylsulfonyl groups can be substituted as described above in the definition of R. Acetyl, propionyl, butyryl, cyanoacetyl, chloroacetyl, phenylacetyl, methoxyacetyl, methylthioacetyl, methylsulfonylacetyl, methoxycarbonyl, propoxycarbonyl, butoxycarbonyl, methylsulfonyl, ethylsulfonyl, propylsulfonyl, butylsulfonyl, 2-cyanoethylsulfonyl, 2-methoxyethylsulfonyl, and 2-chloroethylsulfonyl, are examples of the alkanoyl, alkoxycarbonyl, and alkylsulfonyl groups which $R^1$ can represent. The aryl group of the aroyl, aryloxycarbonyl, arylsulfonyl, and arylcarbamoyl group is preferably monocyclic, carbocyclic aryl such as unsubstituted phenyl and phenyl substituted with, for example, lower alkyl, lower alkoxy, halogen, etc. Tolyl, anisyl, p-bromophenyl, and o,p-dichlorophenyl are typical of such aryl groups. Dimethylcarbamoyl, ethylcarbamoyl, propylcarbamoyl, and butylcarbamoyl are illustrative alkylcarbamoyl groups which $R^1$ can represent.

Methyl, ethyl, methoxy, ethoxy, propoxy, butoxy, etc. are typical alkyl and alkoxy groups which $R^2$ can represent.

The alkyl groups represented by $R^3$ can be straight- or branched-chain alkyl having from 1 to about 6 carbon atoms. Methyl, ethyl, propyl, isopropyl, butyl, isobutyl, amyl, hexyl, etc. are examples of such alkyl groups. Methyl, ethyl, propyl, butyl, methoxy, ethoxy, butoxy, chlorine, and bromine are typical substituents which $R^5$ can represent. When $n$ is 2, the substituents represented by $R^5$ can be the same or different.

Particularly fast dyeings on polyester materials are obtained from the compounds having the formula

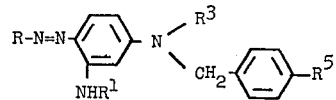

wherein R represents a heterocyclic group having the formula

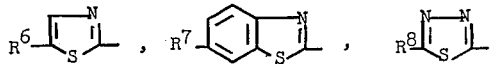

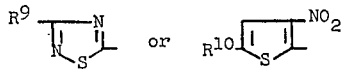

wherein $R_6$ is cyano, nitro, lower alkylsulfonyl, or lower alkoxycarbonyl;

$R^7$ is cyano, nitro, lower alkylsulfonyl, lower alkoxycarbonyl, or thiocyanato;

$R^8$ is lower alkyl, lower alkylthio, cyclohexylthio, phenylthio, lower alkylsulfonyl, or lower alkoxycarbonyl;

$R^9$ is lower alkylthio or lower alkylsulfonyl; and $R^{10}$ is lower alkanoyl, benzoyl, lower alkylbenzoyl, lower alkoxybenzoyl, halobenzoyl, or nitrobenzoyl;

$R^1$ is lower alkanoyl, benzoyl, lower alkoxycarbonyl, lower alkylsulfonyl, or lower alkylcarbamoyl;

$R^3$ is alkyl having from 1 to about 6 carbon atoms; and $R^5$ is hydrogen, methyl, methoxy or chlorine.

The novel azo compounds of the invention are prepared according to known procedures by diazotizing an amine having the formula $R-NH_2$ and coupling the resulting diazonium salt with a compound having the formula

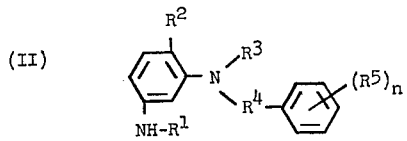

wherein R, $R^1$, $R^2$, $R^3$ and $R^4$ are defined above. The compounds of Formula II are prepared by either of two reactions:

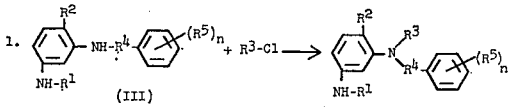

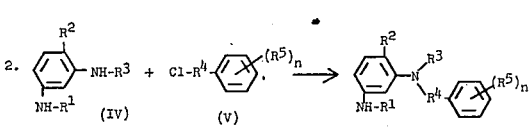

The compounds of Formula III can be obtained by reacting an m-acylamidoaniline with a compound of Formula V. Another procedure that can be employed is the reaction of an m-acylamidoaniline with a benzaldehyde or arylacetaldehyde followed by hydrogenation of the resulting anil according to the following reaction sequence:

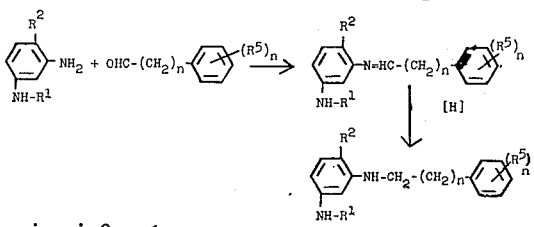

wherein $n$ is 0 or 1.

The preparation of the intermediates of Formula II and representative compounds of the invention are further illustrated by the following examples.

PREPARATION OF THE COUPLERS

Example 1

A mixture of 15.0 g. 3'-aminoacetanilide, 12.7 g. benzylchloride, and 25 ml. N,N-dimethylformamide are heated for 12 min. at 60–65° C. and then drowned in 350 ml. of water. The product is collected by filtration and recrystallized from 250 ml. of benzene, plus 50 ml. of hexane. The product obtained, 3-acetamido-N-benzyl-aniline, melts at 129–130° C. N-benzyl-m-acetamido-aniline (12.0 g.), ethyl bromide (10.9 g.), and triethyl phosphate (25.0 ml.) are refluxed for 5 hr. and then drowned in water. The solution is neutralized with ammonium hydroxide and the product extracted with benzene. The benzene is removed by evaporation to yield the coupler, N-benzyl-N-ethyl-m-acetamidoaniline.

Example 2

A mixture of 18.0 g. 3'-nitroacetanilide, 2.0 g. sodium acetate, 31.8 g. benzaldehyde, 150 ml. ethanol, and 3 g. Raney nickel is hydrogenated at 75° C. and 1500 p.s.i. until the hydrogen uptake ceases. Ethanol (100 ml.) is added to the product from the autoclave. After heating to dissolve the product, the Raney nickel is removed by filtration. After removing most of the solvent by evaporation, the residue is poured into water. The product, N-benzyl-m-acetamidoaniline, is collected by filtration, washed with water, and air dried. It melts at 128–130° C.

Example 3

3'-aminoacetanilide (15.0 g.), 2-phenylethylbromide (18.5 g.) and N,N-dimethylformamide (25 ml.) are heated at 80° C. for 1.25 hr. The reaction mixture is drowned into water. The slightly gummy product is collected by filtration and air dried. The product, 3-acetamido-N-(2-phenylethyl)aniline can be reacted with ethyl bromide as described in Example 1 to prepare the coupler, 3-acetamido-N-ethyl-N-(2-phenylethyl)aniline.

Example 4

A mixture of 18.0 g. m-nitroacetanilide, 2.0 g. sodium acetate, 21.6 g. isobutyraldehyde, 3.0 g. Raney nickel catalyst, and 150 ml. of ethanol is hydrogenated at 75° C. and at 1500 p.s.i. pressure until no more hydrogen is taken up. The Raney nickel is removed by filtration and the ethanol evaporated. The oily residue is washed twice with water by decantation. The product, 3-acetamido-N-isobutylaniline, solidifies on standing and weighs about 20 g.

Example 5 m-Nitroacetanilide (54.0 g.) is mixed with 2-butanone (2.16 g.) and 2 g. 1% Pt on carbon catalyst. The mixture is hydrogenated at 160–165° C. and at 1000 p.s.i. for 4 hr. Removal of the excess 2-butanone results in a quantitative yield of product, 3-acetamido-N-sec.-butylaniline, which slowly crystallizes.

Example 6 m-Nitroacetanilide (52.0 g.) and 216 g. 4-methyl-2-pentanone are reacted and hydrogenated as described in Example 5 to give a quantitative yield of product, 3-acetamido-N-(1,3-dimethylbutyl)aniline.

Each of the compounds obtained in Examples 4, 5 and 6 can be further reacted with benzyl chloride or β-phenylethyl chloride to prepare the couplers.

Couplers containing acylamido groups other than acetamido are prepared by reacting m-nitroaniline with the appropriate acylating agent and then reducing the resulting nitroanilide to the corresponding aminoanilide. The aminoanilide is then reacted with a benzyl halide or phenylethyl halide and the resulting intermediate is treated with an alkyl halide as described in Examples 1 and 3. Alternatively, the nitroanilide can be condensed with an aldehyde or ketone as described in Examples 2, 4, 5 and 6. The couplers of Table I are prepared by the following reactions:

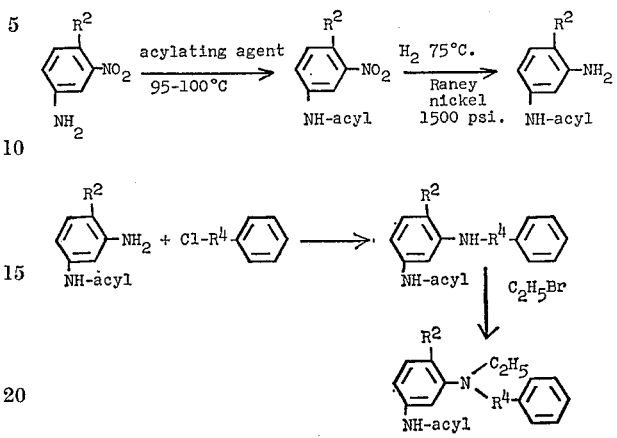

TABLE I

| Ex. No. | Acyl | Acylating agent | R⁴ |
|---|---|---|---|
| 7 | $C_2H_5CO-$ | Propionic anhydride | $-CH_2-$ |
| 8 | $HCO-$ | Formic acid | $-CH_2-$ |
| 9 | $C_2H_5OOC-$ | Ethyl chloroformate | $-CH_2CH_2-$ |
| 10 | $CH_3SO_2-$ | Methanesulfonyl chloride | $-CH_2-$ |
| 11 | $p-CH_3-C_6H_5SO_2-$ | p-Toluenesulfonyl chloride | $-CH_2CH_2-$ |
| 12 | $C_2H_5NHCO-$ | Ethyl isocyanate | $-CH_2-$ |
| 13 | (furoyl) | 2-furoyl chloride | $-CH_2-$ |
| 14 | $C_6H_{11}CO-$ | Cyclohexylcarbonyl chloride | $-CH_2CH_2-$ |
| 15 | $C_6H_5CO-$ | Benzoyl chloride | $-CH_2-$ |

PREPARATION OF THE AZO COMPOUNDS

Example 16

To 2.9 g. of 2-amino-5-nitrothiazole, stirred in 25 ml. of water, is added 13.6 ml. of conc. $H_2SO_4$. Solution occurs immediately. The solution is cooled to −10° C. and a solution of 1.4 g. $NaNO_2$ in 10 ml. conc. $H_2SO_4$ is added below −5° C. Stirring is continued at about −5° C. for 15 min.; the diazonium solution is added to a chilled solution of 5.36 g. of 3-acetamido-N-benzyl-N-ethylaniline dissolved in 100 ml. of 15% $H_2SO_4$ plus 100 ml. of 1:5 acid at about 0° C. The reaction mixture is allowed to stand at 0–5° C. for 30 min.; the coupling mixture is then drowned in water. The product is collected by filtration, washed with water, and dried in air. The azo product produces heavy reddish-blue shades on polyester fibers and has the following structure:

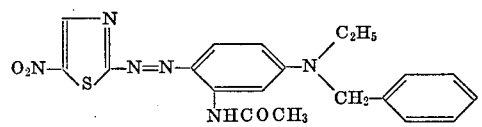

Example 17

2-amino-5-nitrothiazole (2.9 g.) is diazotized and coupled with 6.0 g. of 5-acetamido-2-methoxy-N-benzyl-N-ethylaniline as in Example 16 to give an azo compound similar in formula to the compound of Example 16 but containing a methoxy group on the coupler in a position para to the acetamido group. This compound imparts fast blue shades to polyester fibers.

Example 18

To 5 ml. of conc. $H_2SO_4$ is added 0.72 g. dry $NaNO_2$ portionwise with stirring. The solution is cooled and 10 ml. of 1:5 acid is added below 15° C. The mixture is cooled further and 1.43 g. of 2-amino-5-carbamylthiazole is added followed by 10 ml. 1:5 acid, all at 0–5° C. After diazotizing at 0–5° C. for 2 hr. the solution is added to a chilled solution of 3.0 g. 3-acetamido-N-benzyl-N-isobutylaniline dissolved in 100 ml. of 1:5 acid. The coupling is buffered with ammonium acetate until it is neutral to Congo red paper. After coupling 2 hr. at 0–5° C., the reaction is drowned in water. The product is collected by filtration, washed with water, and dried in air. The azo compound obtained colors polyester fibers bright red shades and has the following structure:

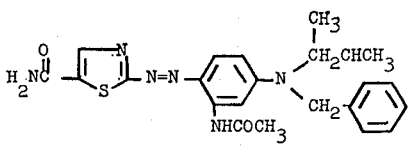

The azo compounds described in the examples of Table II which correspond to the formula

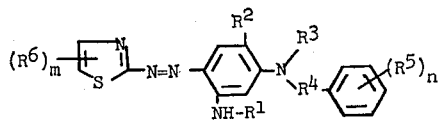

are prepared according to the general procedures described in Examples 16 and 18. The color given for each of the compounds of Table II, and also in the subsequent table, refers to polyester fibers dyed with the azo compound.

ml. conc. H₂SO₄ is added below 0° C. After stirring at about 0° C. for 2 hr. the diazotization solution is added to a solution of 2.25 g. N-ethyl-N-p-chlorobenzyl-m-methylsulfonamidoaniline in a mixture of 50 ml. 15% H₂SO₄ and 50 ml. 1:5 acid, all at about 0° C. The coupling mixture is allowed to couple 2 hr. at ice-bath temperature and then is drowned with water. The azo compound is collected by filtration, washed with water, and air dried. The product dyes polyester fibers a fast violet shade.

Example 35

Sodium nitrite (0.76 g.) is added portionwise to 5 ml. of conc. H₂SO₄. This solution is cooled in an ice bath and 10 ml. 1:5 acid is added, keeping the temperature below 15° C. This mixture is stirred at 0–5° C. and 1.75 g. of 2-amino-6-cyanobenzothiazole is added, followed by 10 ml. of 1:5 acid. The diazotization is stirred at 0–5° C. for 2 hr. and is then added to a solution of 2.68 g. 3-acetamido-N-benzyl-N-ethylaniline in 100 ml. of 1:5 acid. The coupling is buffered with solid ammonium acetate and allowed to react at about 5° C. for 2 hr. After drowning in water, the product is collected by filtration, washed with water, and dried in air. The product produces bright red shades on polyester fibers and has the structure

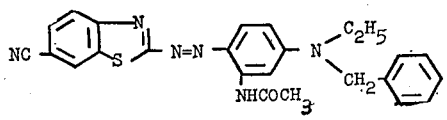

TABLE II

| Example No. | (R⁶)ₘ | R¹ | R² | R³ | R⁴ | R⁵ | Color |
| --- | --- | --- | --- | --- | --- | --- | --- |
| 19 | 5-NO₂ | —COC₆H₅ | H | —CH₂CH(CH₃)CH₃ | —CH₂— | H | Blue. |
| 20 | 5-NO₂ | —COOC₂H₅ | H | —C₂H₅ | —CH₂— | H | Do. |
| 21 | 5-NO₂ | —COCH₃ | H | —C₂H₅ | —CH₂— | 4-OCH₃ | Do. |
| 22 | 5-NO₂ | —COC₆H₅ | —OCH₃ | —CH₂CH₂CH₃ | —CH₂— | 4-OCH₃ | Do. |
| 23 | 4-CH₃-5-NO₂ | —COCH₃ | H | —CH₂CH(CH₃)₂ | —CH₂CH₂— | H | Do. |
| 24 | 5-NHCOCH₃ | —COCH₃ | H | —CH(CH₃)CH₂CH₃ | —CH₂— | H | Violet. |
| 25 | 4-C₆H₅-5-SCN | —COOCH₃ | H | CH(CH₃)CH₂CH(CH₃)CH₃ | —CH₂— | H | Do. |
| 26 | 4-C₆H₅ | —CHO | H | —C₂H₅ | —CH₂— | H | Red. |
| 27 | 5-COOC₂H₅ | —SO₂CH₃ | H | —C₂H₅ | —CH₂— | H | Red. |
| 28 | 5-SO₂C₄H₉-n | p-CH₃—C₆H₄SO₂— | H | —C₂H₅ | —CH₂CH₂— | H | Violet. |
| 29 | 5-Br | —CONHC₂H₅ | H | —C₂H₅ | —CH₂— | H | Red. |
| 30 | 4-CF₃ | 2-furoyl | H | —C₂H₅ | —CH₂— | H | Red. |
| 31 | 5-CN | CCOC₅H₁₁ | H | —C₂H₅ | —CH₂CH₂— | H | Violet. |
| 32 | H | —COC₆H₄-p-CH₃ | H | —C₂H₅ | —CH₂— | H | Red. |

Example 33

To 2.28 g. of 2-amino-6-methylsulfonylbenzothiazole suspended in 24 ml. is added 26.2 g. conc. H₂SO₄. After all the amine has dissolved, the solution is cooled and a solution of 0.84 g. NaNO₂ in 5.0 ml. conc. H₂SO₄ is added portionwise below 0° C. The diazotization is stirred for 2 hr. at about 0° C. and then added to a solution of 3.4 g. N - isobutyl-N-β-phenylethyl-m-ethylureidoaniline dissolved in 75 ml. of 15% H₂SO₄, all below 15° C. The temperature is kept at 0–5° C. for 1 hr. and then the coupling mixture is drowned with water. The product is collected by filtration, washed with water, and air dried. The azo compound obtained gives fast red dyeings on polyester fibers and has the structure:

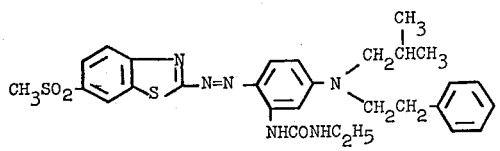

Example 34

To 1.95 g. 2-amino-6-nitrobenzothiazole, suspended in 24 ml. water, is added 14 ml. conc. H₂SO₄. The solution is cooled to —5° C. and a solution of 0.72 g. NaNO₂ in 5

Example 36

To 2.28 g. of 2-amino-6-methylsulfonylbenzothiazole suspended in 24 ml. of water is added 26.2 g. of conc. H₂SO₄. After all of the amine has dissolved, the solution is cooled and a solution of 0.84 g. of NaNO₂ in 5.0 ml. of conc. H₂SO₄ is added portionwise below 0° C. The diazotization is stirred at about 0° C. for 2 hr. and then the solution is added to a chilled solution of 2.68 g. 3-acetamido N-benzyl-N-ethylaniline in 50 ml. 15% H₂SO₄ plus 50 ml. of 1:5 acid, all at about 5° C. After allowing to couple 1 hr. at 0–5° C., the dye is drowned in water, filtered, washed with water, and air dried. The azo compound obtained imparts bright fast red shades to polyester fibers.

The azo compounds described in the examples of Table II are prepared according to the procedures set forth in Examples 33–36 by diazotizing the appropriate 2-aminobenzothiazole and coupling the resulting diazonium with the appropriate 3-acylamido-N-benzylaniline. The compounds of Table III conform to the formula

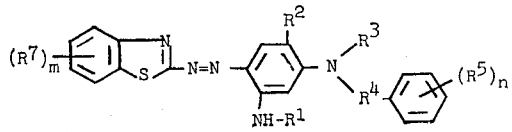

TABLE III

| Example No. | $(R^7)_m$ | $R^1$ | $R^2$ | $R^3$ | $R^4$ | $R^5$ | Color |
|---|---|---|---|---|---|---|---|
| 37 | 6-SO$_2$CH$_3$ | —COCH$_3$ | H | —C$_4$H$_9$-n | —CH$_2$— | H | Red. |
| 38 | 6-NO$_2$ | —COCH$_2$OCH$_3$ | H | —C$_2$H$_5$ | —CH$_2$— | H | Violet. |
| 39 | 6-CN | —COOC$_2$H$_5$ | H | —C$_2$H$_5$ | —CH$_2$— | H | Red. |
| 40 | 6-SO$_2$CH$_2$CH$_2$CN | —COC$_2$H$_5$ | H | —C$_6$H$_{11}$ | —CH$_2$— | 3-OCH$_3$ | Red. |
| 41 | 6-CH$_3$ | —COC$_6$H$_5$ | H | —CH$_2$CH$_2$OCH$_3$ | —CH$_2$CH$_2$— | H | Red. |
| 42 | 6-Cl | —COCH$_3$ | H | —CH(CH$_3$)$_2$ | Same | H | Red. |
| 43 | 6-NHCOCH$_3$ | —COC$_6$H$_{11}$ | H | —CH$_2$CH(CH$_3$)$_2$ | —CH$_2$— | 4-CH$_3$ | Red. |
| 44 | 6-SCN | —COC$_6$H$_4$-p-Cl | —OCH$_3$ | —C$_2$H$_5$ | —CH$_2$— | Cl | Violet. |
| 45 | 6-COOC$_2$H$_5$ | —COCH$_3$ | —OCH$_3$ | —CH$_3$ | —CH$_2$— | H | Do. |
| 46 | 6-Cl-6-SO$_2$CH$_3$ | Same | H | —C$_2$H$_5$ | —CH$_2$CH$_2$— | 4-OC$_2$H$_5$ | Red. |
| 47 | 4,6-di-NO$_2$ | —COOCH$_3$ | H | —C$_2$H$_5$ | Same | H | Blue. |
| 48 | 4,6-di-Cl | —COOC$_4$H$_9$-n | H | —C$_2$H$_5$ | —CH$_2$— | H | Red. |
| 49 | 6-SO$_2$C$_4$H$_9$-n | —COOCH$_2$CH$_2$CN | —OCH$_3$ | —C$_2$H$_5$ | —CH$_2$— | 4-OH | Red. |
| 50 | 6-SO$_2$NH$_2$ | —COCH$_3$ | H | —CH$_3$ | —CH$_2$— | H | Red. |
| 51 | 6-SO$_2$N(CH$_3$)$_2$ | —CONHC$_2$H$_5$ | —CH$_3$ | —C$_2$H$_5$ | —CH$_2$— | 4-Br | Red. |
| 52 | 6-SO$_2$CH$_3$ | —CHO | —C$_2$H$_5$ | —C$_2$H$_5$ | —CH$_2$CH$_2$— | H | Red. |
| 53 | Same | —SO$_2$C$_6$H$_4$-p-Cl | H | —C$_2$H$_5$ | —CH$_2$— | H | Red. |
| 54 | do | —COC$_2$H$_4$Cl | H | —C$_2$H$_5$ | —CH$_2$— | H | Red. |
| 55 | 6-CN | —COCH$_3$ | —OC$_2$H$_5$ | —C$_2$H$_5$ | —CH$_2$— | H | Violet. |

Example 56

To 1.63 g. 2-amino-5-methylsulfonyl-1,3,4-thiadiazole slurried in 24 ml. water, is added 14 ml. conc. H$_2$SO$_4$. The resulting solution is cooled to 0° C. and a solution of 1.44 g. NaNO$_2$ in 10 ml. conc. H$_2$SO$_4$ is added below 5° C. The diazotization is stirred at ice-bath temperature for 2 hrs. It is then added to a cold solution of 3.3 g. 3-benzamido-N-ethyl-N-benzylaniline in 100 ml. of 1:5 acid. The coupling is buffered with solid ammonium acetate and allowed to stand 2 hrs. It is then drowned in water. The dye is collected by filtration, washed with water, and air dried. The azo compound obtained dyes polyester fibers bright red shades having excellent fastness properties.

Example 57

Sodium nitrite (0.72 g.) is added portionwise to 5 ml. of conc. H$_2$SO$_4$. The solution is cooled and 10 ml. of 1:5 acid is added below 15° C. The mixture is cooled further and 1.47 g. 2-amino-5-methylthio-1,3,4-thiadiazole is added followed by 10 ml. 1:5 acid, all below 5° C. After stirring for 2 hrs. at 0–5° C., the diazonium solution is added to a chilled solution of 2.68 g. 3-acetamido-N-benzyl-N-ethylaniline in 100 ml. of 1:5 acid below 5° C. The reaction is kept cold and ammonium acetate added until the coupling mixture is neutral to Congo Red test paper. After allowing to couple 1 hr. at about 5° C., the reaction mixture is drowned in water. The product is collected by filtration, washed with water, and dried in air. The dye produces bright red shades on polyester fibers and has good lightfastness and resistance to sublimation. This azo compound has the structure 1,3,4-thiadiazoles employed in Examples 56 and 57. For example, when 1.47 g. 5-amino-3-methylthio-1,2,4-thiadiazole is diazotized and coupled with 2.68 g. 3-acetamido-N-benzyl-N-ethylaniline according to the procedure described in Example 57, the azo compound having the formula

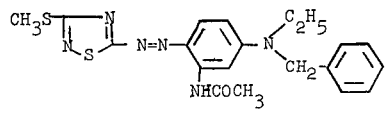

is obtained. The compound imparts bright, fast red shades to polyester fibers.

The azo compounds described in the examples of Table IV are prepared by the procedures employed in Examples 56 and 57. These compounds conform to the general formula

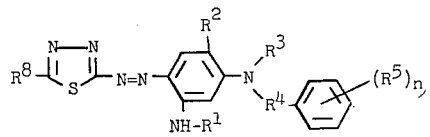

When $R^8$ is alkylthio, cyclohexylthio, or alkylsulfonyl, the isomeric 1,2,4-thiadiazol-5-ylazo compounds are prepared by the same procedure as mentioned hereinabove. These isomeric compounds give dyeings on polyester fibers substantially identical in color fastness properties and slightly redder in shade as those produced by the corresponding 1,3,4-thiadiazol-2-ylazo compounds.

TABLE IV

| Example No. | $R^8$ | $R^1$ | $R^2$ | $R^3$ | $R^4$ | $R^5$ | Color |
|---|---|---|---|---|---|---|---|
| 58 | —SCH$_3$ | —COC$_6$H$_5$ | H | —C$_2$H$_5$ | —CH$_2$— | H | Red. |
| 59 | —SC$_2$H$_5$ | —COCH$_3$ | H | —C$_2$H$_5$ | —CH$_2$— | 4-Cl | Red. |
| 60 | —SC$_2$H$_5$ | —COOC$_2$H$_5$ | H | —CH$_2$CH(CH$_3$)$_2$ | —CH$_2$— | 4-OCH$_3$ | Red. |
| 61 | —C$_6$H$_5$ | —COCH$_3$ | H | —C$_2$H$_5$ | —CH$_2$— | H | Red. |
| 62 | —C$_6$H$_5$ | —COC$_6$H$_5$ | H | —C$_2$H$_5$ | —CH$_2$— | H | Red. |
| 63 | —SC$_6$H$_5$ | Same | H | —C$_4$H$_9$-n | —CH$_2$CH$_2$— | H | Red. |
| 64 | —SC$_6$H$_{11}$ | —CONHC$_2$H$_5$ | H | —C$_2$H$_5$ | —CH$_2$— | H | Red. |
| 65 | —CH$_3$ | —COC$_6$H$_5$ | H | —C$_2$H$_5$ | —CH$_2$— | H | Red. |
| 66 | —CH$_3$ | —SO$_2$CH$_3$ | H | —C$_2$H$_5$— | —CH$_2$— | 4-CH$_3$ | Red. |
| 67 | —SCH$_2$CH$_2$OH | —COC$_2$H$_5$ | H | —CH(CH$_3$)CH$_2$CH$_3$ | —CH$_2$— | H | Red. |
| 68 | —SCH$_2$CH$_2$CN | —CHO | H | —CH(CH$_3$)$_2$ | —CH$_2$— | H | Red. |
| 69 | —Br | —SO$_2$C$_6$H$_4$-p-CH$_3$ | H | —C$_2$H$_5$ | —CH$_2$CH$_2$— | H | Red. |
| 70 | —SO$_2$CH$_3$ | —COCH$_3$ | —OCH$_3$ | —C$_2$H$_5$ | —CH$_2$— | 2,4-di-CH$_3$ | Red. |

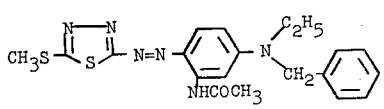

The compounds of the invention having a 1,2,4-thiadiazol-5-yl diazo component are prepared by substituting the isomeric 5-amino-1,2,4-thiadiazole for the 2-amino-1,3,4-thiadiazoles employed in Examples 56 and 57. For Example 71

To 5 ml. of concentrated sulfuric acid is added portionwise 0.72 g. of sodium nitrile with stirring. The nitrosyl sulfuric acid solution is cooled and 10 ml. of 1:5 acid (1 part propionic to 5 parts acetic) is added below 10° C. 2 - amino - 3 - nitro - 5 - propionylthiophene is added to acid solution followed by 10 ml. of 1:5 acid, all at 0–5° C. The mixture is stirred at 0–5° C. for one hour.

The diazonium solution is then added to a chilled solution of 2.68 g. of 3-acetamido-N-benzyl-N-ethylaniline dissolved in 75 ml. of 1:5 acid. The coupling mixture is stirred occasionally for one hour and then it is drowned with water. The product is collected by filtration, washed with water, and air dried. It produces heavy blue shades on polyester fibers and has the formula

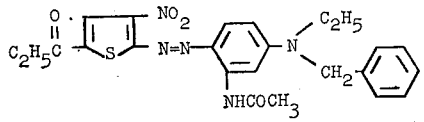

The thienylazo compound described in the examples of Table V conform to the formula

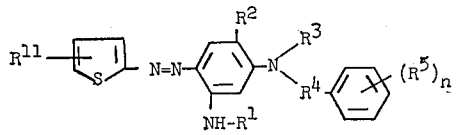

is collected and washed well with water. The azo compound imparts yellow shades to polyester fibers and has the structure

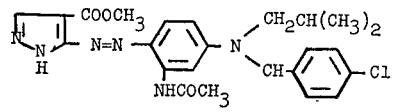

The azo compounds of the examples in Table VI give yellow dyeings on polyester fibers and conform to the formula

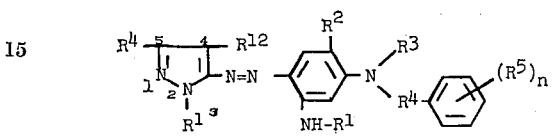

The azo compounds of Table VI are prepared by the procedure disclosed in Example 91.

TABLE VI

| Ex. No. | $R^{11}$ | $R^{12}$ | $R^{13}$ | $R^1$ | $R^2$ | $R^3$ | $R^4$ | $R^5$ |
|---|---|---|---|---|---|---|---|---|
| 92 | H | —CN | H | —COCH$_3$ | H | —C$_2$H$_5$ | —CH$_2$CH$_2$— | H |
| 93 | H | —COOC$_2$H$_5$ | —C$_6$H$_5$ | —COOC$_2$H$_5$ | H | —CH(CH$_3$)$_2$ | —CH$_2$— | H |
| 94 | H | —COOCH(CH$_3$)$_2$ | —SO$_2$C$_6$H$_5$ | —COC$_6$H$_5$ | H | —C$_2$H$_5$ | —CH$_2$— | H |
| 95 | H | —NO$_2$ | —C$_6$H$_5$ | —SO$_2$CH$_3$ | —OCH$_3$ | —CH$_2$CH(CH$_3$)$_2$ | —CH$_2$— | 4-OC$_2$H$_5$ |
| 96 | H | —CONH$_2$ | —C$_6$H$_5$ | —SO$_2$C$_6$H$_5$ | H | —C$_2$H$_5$ | —CH$_2$— | 4-CH$_3$ |
| 97 | —CN | —CN | —SO$_2$C$_6$H$_5$ | —COC$_6$H$_4$-p-CH$_3$ | H | —C$_2$H$_5$ | 2,4-di-OC$_2$H$_5$ | H |
| 98 | H | —CONH$_2$ | —SO$_2$C$_2$H$_5$ | —CONHC$_2$H$_5$ | H | —C$_2$H$_5$ | —CH$_2$— | H |
| 99 | —CH$_3$ | —CN | —CH$_3$ | —COCH$_3$ | H | —C$_2$H$_5$ | —CH$_2$— | H |
| 100 | H | —COOCH$_3$ | H | Same | H | —C$_2$H$_5$ | —CH$_2$CH$_2$— | H |
| 101 | H | Same | H | —COC$_6$H$_5$ | H | —C$_2$H$_5$ | —CH$_2$— | H | and are prepared by diazotizing the appropriate 2-aminothiophene and coupling it with a 3-acylamido-N-aralkyl-aniline as described in Example 71.

The compounds of the invention can be used for dyeing linear polyester textile materials in the manner described in U.S. Pats. 2,880,050, 2,757,064, 2,782,187 and 3,043,-

TABLE V

| Example No. | $R^{10}$ | $R^1$ | $R^2$ | $R^3$ | $R^4$ | $R^5$ | Color |
|---|---|---|---|---|---|---|---|
| 72 | 5-COCH$_3$-3-NO$_2$ | —COCH$_3$ | H | —C$_2$H$_5$ | —CH$_2$ | H | Blue. |
| 73 | Same | —COC$_6$H$_5$ | H | —C$_2$H$_5$ | —CH$_2$— | H | Do. |
| 74 | 5-COCH(CH$_3$)$_2$-3-NO$_2$ | —COC$_2$H$_5$ | H | —CH$_2$CH(CH$_3$)$_2$ | —CH$_2$CH$_2$— | H | Do. |
| 75 | 5-COCH$_3$-3-NO$_2$ | —COC$_6$H$_5$ | H | —C$_2$H$_5$ | —CH$_2$— | 4-Cl | Do. |
| 76 | 3,5-di-CH$_3$SO$_2$— | —COCH$_3$ | H | —C$_2$H$_5$ | —CH$_2$— | 4-OCH$_3$ | Do. |
| 77 | 5-COC$_2$H$_5$-3-NO$_2$ | —COC$_6$H$_5$ | H | —C$_2$H$_5$ | —CH$_2$— | Same | Do. |
| 78 | 5-COOC$_2$H$_5$-3-NO$_2$ | Same | H | —C$_2$H$_5$ | —CH$_2$— | 4-CH$_3$ | Do. |
| 79 | 5-CH$_3$SO$_2$-3-NO$_2$ | do | H | —C$_2$H$_5$ | —CH$_2$— | H | Do. |
| 80 | 5-COCH(CH$_3$)-3-NO$_2$ | —COCH$_3$ | —OCH$_3$ | —C$_2$H$_5$ | —CH$_2$— | H | Turquoise. |
| 81 | 5-COCH(CH$_3$)-3-NO$_2$ | —COC$_6$H$_5$ | —OCH$_3$ | —C$_2$H$_5$ | —CH$_2$— | H | Do. |
| 82 | 5-COC$_6$H$_4$-m-NO$_2$-3-NO$_2$ | —COOC$_2$H$_5$ | H | —C$_2$H$_5$ | —CH$_2$— | 2,4-di-OH | Blue. |
| 83 | 5-C$_2$H$_5$HNSO$_2$-2-NO$_2$ | —COCH$_2$C$_6$H$_5$ | H | —C$_2$H$_5$ | —CH$_2$— | H | Do. |
| 84 | —COCH(CH$_3$)$_2$ | —COCH$_2$Cl | H | —C$_2$H$_5$ | —CH$_2$— | H | Do. |
| 85 | 3-NO$_2$ | —COCH$_2$OCH$_3$ | H | —C$_2$H$_5$ | —CH$_2$— | H | Do. |
| 86 | 5-COOC$_2$H$_5$ | —COCH$_2$CH$_2$Cl | H | —C$_2$H$_5$ | —CH$_2$— | H | Red. |
| 87 | —COC$_6$H$_4$-p-Cl | —COCH$_3$ | H | —C$_2$H$_5$ | —CH$_2$— | H | Blue. |
| 88 | 3,5-di-NO$_2$ | —COC$_6$H$_5$ | H | —CH$_2$CH(CH$_3$)$_2$ | —CH$_2$CH$_2$— | H | Blue-green. |
| 89 | —COC$_6$H$_4$-p-CH$_3$ | —CHO | H | —C$_2$H$_5$ | —CH$_2$— | 4-Cl | Blue. |
| 90 | —COOCH(CH$_3$)$_2$ | —SO$_2$CH$_3$ | —CH$_3$ | —CH(CH$_3$)CH$_2$CH$_3$ | —CH$_2$— | H | Do. |

Example 91

Ten ml. of 1:5 acid (1 part propionic:5 parts acetic) are added to a solution of nitrosylsulfuric acid prepared from sodium nitrite (0.72 g.) and sulfuric acid (5 ml.). The solution is cooled to 3° C. and 3-aminopyrazole-4-carboxylic acid methyl ester (1.41 g.) is added below 5° C. followed by a second portion of 1:5 acid (10 ml.) at the same temperature. The diazotization is completed by stirring for two hours at 3–5° C. This diazo solution is added to a cooled solution of 3.3 g. of 3-acetamido-N-p-chlorobenzyl - N - isobutylaniline in 1:5 acid (100 ml.). The mineral acid is neutralized by the addition of solid ammonium acetate maintaining the temperature at 0° C. or below. When the coupling is complete, water (500 ml.) is added with good stirring. The precipitated yellow solid 827. The novel monoazo compounds are water-insoluble, i.e. substantially water-insoluble, and therefore they can be applied to polyester fibers according to conventional disperse dyeing techniques. The following example illustrates a carrier dyeing procedure for applying the azo compounds of the invention to dye polyester textile materials.

Example 102

An amount of 0.1 g. of the azo compound is dissolved in 10 cc. of 2-methoxyethanol. A small amount (3–5 cc.) of a 3% sodium lignin sulfonate aqueous solution is added, with stirring, and then the volume of the bath is brought to 300 cc. with water. 3 cc. of an anionic solvent carrier (Tanavol) is added to the bath and 10 grams of a textile fabric made of poly(ethylene terephthalate) fibers is placed in the bath and worked 10 minutes without heat. The dyeing is carried out at the boil for one hour. The dyed fabric is removed from the dyebath and scoured for 20 minutes at 80° C. in a solution containing 1 g./l. neutral soap and 1 g./l. sodium carbonate. The fabric is then rinsed, dried in an oven at 250° F. and heat set (for the removal of residual carrier) for 5 minutes at 350° C.

The compounds of the invention can also be applied to polyester textile materials by the heat fixation technique described in U.S. Pat. 2,663,612 and in the American Dyestuff Reporter, 42, 1 (1953). The following procedure describes how the azo compounds of the invention can be applied to polyester materials by the heat fixation technique.

Example 103

A mixture of:

500 mg. of the compound of Example 16, 150 mg. of a sodium lignosulfonate dispersing agent (Marasperse N), 150 mg. of a partially desulfonated sodium lignosulfonate (Marasperse CB), 0.5 ml. glycerin, and 1.0 ml. of water is ground in a microsize container (an accessory for a 1-quart size Szegvari Attritor) for approximately 3.5 hours. Enough ⅛-inch stainless steel balls are added to provide maximum grinding. When the grinding is complete, the entire contents are poured into a beaker and 100 ml. of water are used to wash the remaining dye paste from the micro-container. The dye paste is then heated slowly to 65° C. with continuous stirring.

A thickener and penetrating mixture is prepared by mixing:

1 ml. of a complex diaryl sulfonate surfactant (compound 8–S), 3 ml. of a 3% solution of a sodium N-methyl-N-oleoyltaurate (Igepon T–S1), 8 ml. of a 25% solution of natural gums (Superclear 8ON), and sufficient water to bring the volume to 100 ml. The thickener and penetrating mixture is added to the dye paste, the volume is adjusted to 200 ml. and the mixture is agitated for 15 minutes. The dye mixture is then filtered through folded cheesecloth to remove the stainless steel balls and it then is added to the reservoir of a Butterworth padder where it is heated to about 45–60° C.

10 g. of a fabric of poly(ethylene terephalate) fibers and 10 g. of a fabric of 65/35 spun poly(ethylene terephthalate)/cotton fibers are sewn together, end-to-end, and padded for 5 minutes of continuous cycling through the dye mixture and between three rubber squeeze rollers of the padder. Dye mixture pick-up is about 60% based on the weight of the fabrics.

The padded fabrics are then dried at 200° F. and then heat-fixed for 2 minutes at 415° F. in a forced air oven. The dyed fabrics are scoured for 20 minutes at 65–70° C. in a solution containing 0.2% sodium hydrosulfite, 0.2% sodium carbonate and 1.7% of a 3% solution of sodium N-methyl-N-oleoyltaurate and then dried. The dyed fabrics possess excellent brightness and exhibit outstanding fastness to light and sublimation when tested according to the procedures described in the 1966 edition of the Technical Manual of the American Association of Textile Chemists and Colorists.

The heat fixation dyeing procedure described above can be varied by the substitution of other dispersing agents, surfactants, suspending agents, thickeners, etc. The temperature and time of the heat-fixation step can also be varied.

Polymeric linear polyester materials of the terephthalate sold under the trademarks "Kodek," "Dacron" and "Terylene" are illustrative of the linear aromatic polyester textile materials that can be dyed with the compounds of our invention. Examples of linear polyeter textile materials that can be dyed with the compounds of the invention are those prepared from ethylene glycol and dimethylterephthalate or from cyclohexanedimethanol and dimethylterephthalate. Polyesters prepared from cyclohexanedimethanol and dimethylterephthalate are more particularly described in U.S. Pat. 2,901,446. Poly(ethylene terephthalate) polyester fibers are described, for example, in U.S. Pat. 2,465,319. The polymeric linear polyester materials disclosed in U.S. Pats. 2,945,010, 2,957,745, and 2,989,363, for example, can be dyed. The linear aromatic polyester materials specifically named have a melting point of at least 200° C. The poly(ethylene terephthalate) fibers which are dyed with the compounds of the invention are manufactured from a melt of a polymer having an inherent viscosity of at least 0.35 and preferably, about 0.6. The inherent viscosity of the poly(1,4-cyclohexylenedimethylene terephthalate) polymer is also at least 0.35. These inherent viscosities are measured at 25° C. using 0.25 g. polymer per 100 ml. of a solvent consisting of 60% phenol and 40% tetrachloroethane. The polyester fabrics, yarns, fibers and filaments that are dyed with the novel azo compounds can also contain minor amounts of other additives such as brighteners, pigments, delusterants, inhibitors, stabilizers, etc. Although the compounds of the invention are particularly suitable for dyeing polyester textile materials, the compounds can also be used to dye other synthetic, hydrophobic textile materials such as cellulose acetate, modified polypropylene, polyamide, modacrylic, etc. fibers.

The invention has been described in considerable detail with particular reference to preferred embodiments thereof, but it will be understood that variations and modifications can be effected within the spirit and scope of the invention as described hereinabove and as defined in the appended claims.

We claim:

1. A monoazo compound having the formula

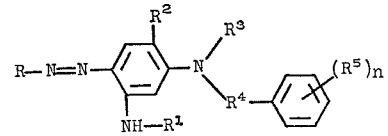

wherein

R is a heterocyclic group having the formula

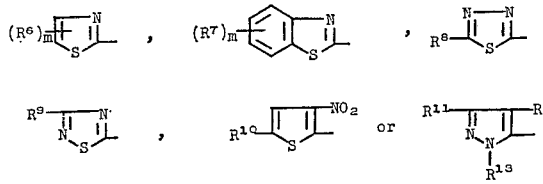

wherein $R^6$ is hydrogen, lower alkyl, lower alkoxy, nitro, chlorine, bromine, lower alkylsulfonyl, carbamoyl, lower alkylcarbamoyl, di-lower alkylcarbamoyl, lower alkoxycarbonyl, sulfamoyl, lower alkylsulfamoyl, di-lower alkylsulfamoyl, cyano, thiocyanato, trifluoromethyl, phenyl, lower alkylphenyl, lower alkoxyphenyl, chlorophenyl, or bromophenyl;

$R^7$ is hydrogen, lower alkyl, lower alkoxy, nitro, chlorine, bromine, lower alkylsulfonyl, lower cyanoalkylsulfonyl, lower hydroxyalkylsulfonyl, lower chloroalkylsulfonyl, lower bromoalkylsulfonyl, carbamoyl, lower alkylcarbamoyl, di-lower alkylcarbamoyl, lower alkoxycarbonyl, sulfamoyl, cyano, thiocyanato, lower alkylthio, cyclohexylthio, phenylthio, lower alkylphenylthio, lower alkoxyphenylthio, chlorophenylthio, bromophenylthio, or trifluoromethyl;

$R^8$ is hydrogen, lower alkyl, lower alkoxy, chlorine, bromine, lower alkylthio, benzylthio, cyclohexylthio, phenylthio, lower alkylphenylthio, lower alkoxyphenylthio, chlorophenylthio, bromophenylthio, benzyl, lower alkylsulfonyl, lower alkanoylamino, benzamido, lower alkoxycarbonyl, or lower alkoxycarbonylalkylthio;

$R^9$ is lower alkylthio, cyclohexylthio, benzylthio, or lower alkylsulfonyl;

R¹⁰ is lower alkanoyl, benzoyl, lower alkylbenozyl, lower alkoxybenzoyl, chlorobenzoyl, bromobenzoyl, or nitrobenzoyl;

R¹¹ is hydrogen, cyano, or lower alkyl;

R¹² is cyano, carbamyl, nitro or lower alkoxycarbonyl;

R¹³ is hydrogen, lower alkyl, phenyl, lower alkylphenyl, lower alkoxyphenyl, chlorophenyl, bromophenyl, lower alkylsulfonyl, phenylsulfonyl, lower alkylphenylsulfonyl, lower alkoxyphenyl-sulfonyl, chlorophenyl, or bromophenylsulfonyl; and m is 1 or 2;

R¹ is formyl, lower alkanoyl, lower chloroalkanoyl, lower bromoalkanoyl, lower phenylalkanoyl, lower cyanoalkanoyl, lower alkoxy-lower-alkanoyl, lower alkyl-lower-alkanoyl, lower alkylsulfonyl-lower-alkanoyl, benzoyl, lower alkylbenzoyl, lower alkoxybenzoyl, chlorobenzoyl, bromobenzoyl, cyclohexylcarbonyl, lower alkoxycarbonyl, phenoxycarbonyl, lower alkylphenoxycarbonyl, lower alkoxyphenoxycarbonyl, chlorophenoxycarbonyl, bromophenoxycarbonyl, lower alkylsulfonyl, lower cyanoalkylsulfonyl, lower chloroalkylsulfonyl, lower bromoalkylsulfonyl, phenylsulfonyl, lower alkylphenylsulfonyl, lower alkoxyphenylsulfonyl, chlorophenylsulfonyl, bromophenylsulfonyl, carbamoyl, lower alkylcarbamoyl, di-lower alkylcarbamoyl, phenylcarbamoyl, lower alkylphenylcarbamoyl, lower alkoxyphenylcarbamoyl, chlorophenylcarbamoyl, or bromophenylcarbamoyl;

R² is hydrogen, lower alkyl, or lower alkoxy;

R³ is alkyl containing from 1 to 6 carbon atoms or cyclohexyl;

R⁴ is alkylene of 1 to 2 carbon atoms;

R⁵ is hydrogen, lower alkyl, lower alkoxy, hydroxy, chlorine, or bromine; and n is 1 or 2.

2. A compound according to claim 1 having the formula

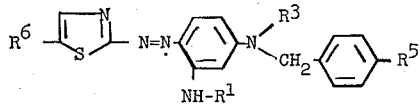

wherein

R⁶ is a cyano, nitro, lower alkylsulfonyl, or lower alkoxycarbonyl;

R¹ is lower alkanoyl, benzoyl, lower alkoxycarbonyl, lower alkylsulfonyl, or lower alkylcarbamoyl;

R³ is alkyl containing from 1 to 6 carbon atoms; and

R⁵ is hydrogen, methyl, methoxy, or chlorine.

3. A compound according to claim 1 having the formula

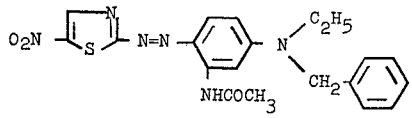

4. A compound according to claim 1 having the formula

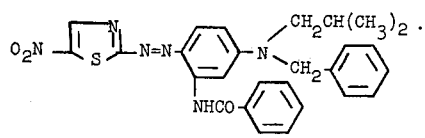

5. A compound according to claim 1 having the formula

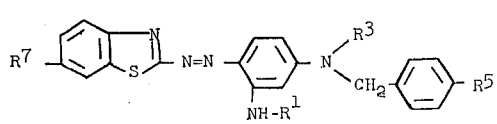

wherein

R⁷ is cyano, nitro, lower alkylsulfonyl, lower alkoxycarbonyl, or thiocyanato;

R¹ is lower alkanoyl, benzoyl, lower alkoxycarbonyl, lower alkylsulfonyl, or alkylcarbamoyl;

R³ is alkyl containing from 1 to 6 carbon atoms; and

R⁵ is hydrogen, methyl, methoxy, or chlorine.

6. A compound according to claim 1 having the formula

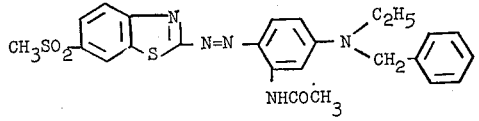

7. A compound according to claim 1 having the formula

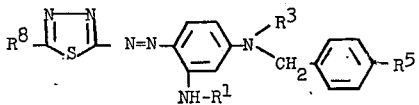

wherein

R⁸ is lower alkyl, lower alkylthio, cyclohexylthio, phenylthio, lower alkylsulfonyl, or lower alkoxycarbonyl;

R¹ is lower alkanoyl, benzoyl, lower alkylsulfonyl, lower alkoxycarbonyl, or lower alkylcarbamoyl;

R³ is alkyl containing from 1 to 6 carbon atoms; and

R⁵ is hydrogen, methyl, methoxy, or chlorine.

8. A compound according to claim 1 having the formula

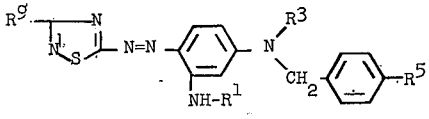

wherein

R⁹ is lower alkylthio or lower alkylsulfonyl;

R¹ is lower alkanoyl, benzoyl, lower alkoxycarbonyl, lower alkylsulfonyl, or lower alkylcarbamoyl;

R³ is alkyl containing from 1 to 6 carbon atoms; and

R⁵ is hydrogen, methyl, methoxy, or chlorine.

9. A compound according to claim 1 having the formula

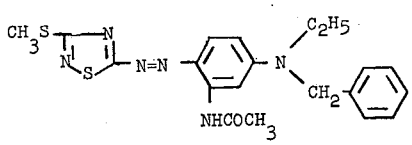

10. A compound according to claim 1 having the formula

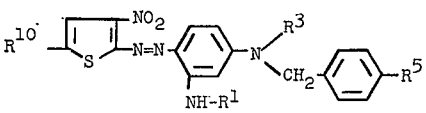

wherein

R¹⁰ is lower alkanoyl, benzoyl, lower alkylbenzoyl, lower alkoxybenzoyl, chlorobenzoyl, bromobenzoyl, or nitrobenzoyl;

R¹ is lower alkanoyl, benzoyl, lower alkoxycarbonyl, lower alkylsulfonyl, or lower alkylcarbamoyl;

R³ is alkyl containing from 1 to 6 carbon atoms; and

R⁵ is hydrogen, methyl, methoxy, or chlorine.

11. A compound according to claim 1 having the formula

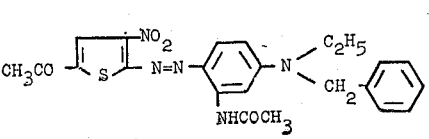

12. A compound according to claim 1 having the formula
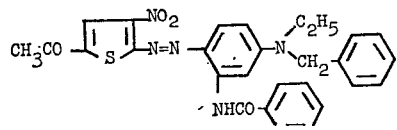
References Cited
UNITED STATES PATENTS
3,483,180  12/1969  Ramanathan _____ 260—158
CHARLES B. PARKER, Primary Examiner
D. M. PAPUGA, Assistant Examiner
U.S. Cl. X.R.
260—158, 162; 8—178, 179